Sept. 6, 1938.    G. R. CUNNINGTON    2,129,167
LAMINATED PANEL
Filed Oct. 14, 1935

INVENTOR.
George R. Cunnington
BY
Parker & Burton
ATTORNEYS.

Patented Sept. 6, 1938

2,129,167

UNITED STATES PATENT OFFICE 2,129,167

LAMINATED PANEL

George R. Cunnington, Detroit, Mich., assignor to Woodall Industries Incorporated, Detroit, Mich., a corporation of Michigan Application October 14, 1935, Serial No. 44,914

13 Claims. (Cl. 154—44)

My invention relates to improvements in laminated structures and particularly to improvements in such structures wherein a compressible fragile interior lamination is arranged between two outer protective laminations and provided with spacers which prevent crushing of the interior lamination, and securing devices which extend through the several laminations holding them together.

An object is to provide such a structure with improved means to secure the several laminations together and which means cooperates with the spacers to permit limited compression of the structure, providing a compact unitary structural assembly which may be piled or packaged for storage or shipment, quickly and readily assembled together, and which is adapted to be quickly and readily attached to a support.

A meritorious feature lies in the association with certain spacer elements of cooperating tubular parts which secure the laminations together with the spacers in position and which tubular parts are adapted to receive fasteners therethrough to attach the structure to a support.

Figure 1:
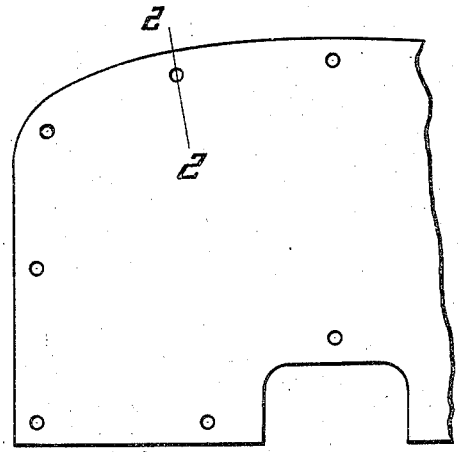
Figure 2:
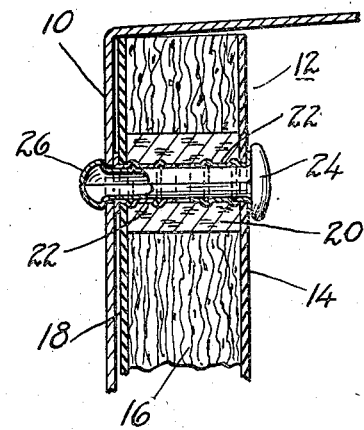
Figure 3:
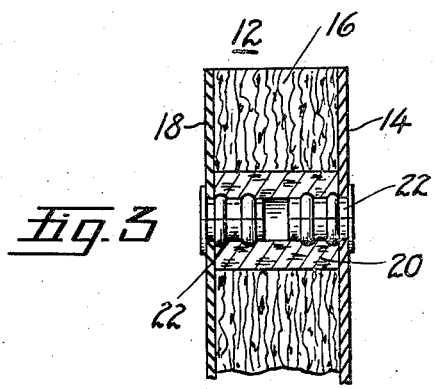
Figure 4:
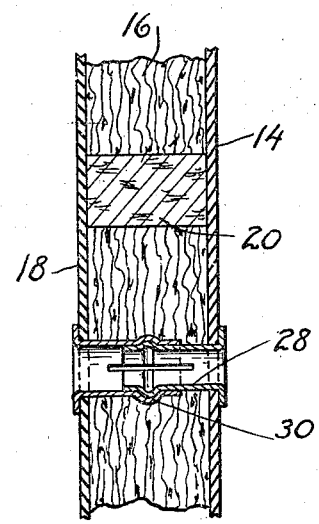
Figure 5:
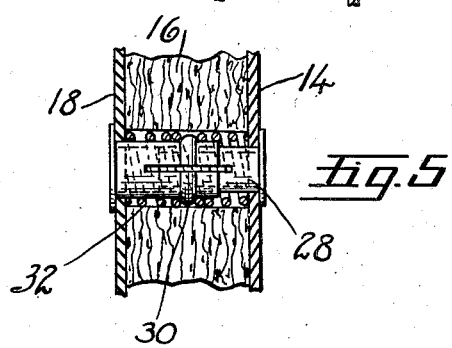

Other objects, advantages, and meritorious features of my invention will more fully appear from the following description, appended claims, and accompanying drawing, wherein:

Figure 1 is a front elevation partly broken away of my improved panel embodied in an automobile dash, Fig. 2 is a cross-sectional view taken on the line 2—2 of Fig. 1, Fig. 3 illustrates a sectional view through my improved structure wherein the several laminations are secured together but the same is independent of its support, Fig. 4 illustrates a modified form of construction, and Fig. 5 illustrates a modified form of construction.

In the embodiment shown in the drawing I have illustrated my laminated structure in a panel such as is used in conjunction with an automobile dash as an insulation panel. The structure, however, is obviously suitable for use in other locations. In an automobile body there is a steel dash which separates the passenger carrying compartment from the engine compartment and my improved panel is embodied in an insulating dash structure adapted to overlie this steel dash within the body compartment to insulate the two compartments from each other and to provide a finished structure which is suitable for the interior of an automobile body.

In the drawing the metal dash is indicated as 10. My improved panel structure is indicated in assembly as 12. It comprises what might be termed a foundation layer 14 with additional superimposed layers. This foundation layer is formed of material suitable for the interior trim of an automobile body at such point. A material which has been found suitable for this use is a composition fiber board sold commercially under the trade name of K B board. This comprises cellulose fibers held together by an adhesive asphaltic compound. Such material is moisture resistant. It is relatively dense and tough and it is thermoplastic so that it may be decoratively embossed or otherwise shaped in contour as desired.

To complete the assembly there is provided a second outer layer which is arranged on the opposite side of the panel and is here indicated as 18 and which also may be formed of K B board or other suitable material such as asphalt saturated paper felt or the like. These two layers serve as the outer protective layers of my improved structure. Between these two laminations is arranged one or more laminations of loosely integrated insulating material. This material is fragile, porous, readily compressible, and possesses high insulating capacity.

A material which I have found suitable is one formed of cellulose fibers very loosely integrated together. It consists of a plurality of gossamerlike layers of asphalt impregnated cellulose fibers. The several layers are held together by the asphaltic binder. The material is moisture resistant in that the cellulose fibers are coated with thin films of asphalt. The material is thermoplastic and under heat and pressure it may be permanently compacted and densified.

In the structure shown in the drawing this interior insulation lamination is shown as made up of a single thickness 16. One or more thicknesses may be employed as desired.

The outer protective layers 14 and 18 are provided with registering apertures and the insulation layer or layers is provided with concentric apertures of increased diameter. Within the apertures in the insulation layer are disposed spacer elements 20 formed of suitable compressible resilient insulation material such as cork, rubber, or the like. These spacer elements preferably have an axial dimension somewhat less than the uncompressed thickness of the insulation lamination within which they are arranged. Certain of these spacer elements are of tubular construction. The axial passageways through the tubular spacer elements are aligned with the apertures through the outer protective layers 14 and 18.

For each tubular spacer element I provide a pair of cooperating split tubular sleeves or ferrules 22. These sleeves are secured to the outer protective laminations as shown in Figs. 2 and 3 and extend into opposite ends of the spacer elements when the several laminations are assembled together as shown. The sleeves are provided with ridges or corrugations which are adapted to secure them to the outer laminations 14 and 18 and also to secure them frictionally in place within the spacer elements and with end flanges which overlie the outer layers 14 and 18. The combined length of the two sleeves within any spacer element is less than the axial dimension of such spacer whereby limited axial compressibility of the spacer is permitted before the two ferrules are brought into engagement to limit such compressibility.

While the spacer elements are compressible they are not compressible to the same extent that the insulation lamination 16 is compressible. The insulation lamination is very easily compressed to a small fraction of its normal thickness while the permitted axial compressibility of these tubular spacers is relatively slight and increasingly resisted and the spacer elements are resilient to return the outer walls of the laminated panel to their proper spacing following temporary compression of the structure as in storage, shipment, or the like.

The sleeves are inserted through the outer protective layers into the spacer as described. In the assembly of the panel one of each pair of split sleeves is received through a provided aperture in one of the outer protective laminations and entered into the provided opening within a spacer element. This secures the spacer to one outer protective lamination. A plurality of the spacers are so secured. This outer lamination so equipped may then serve as a foundation lamination, and as a jig upon which the other additional laminations may be assembled. When the several laminations are assembled thereupon and the other sleeve part inserted the structure is complete as shown in Fig. 3.

To assemble this structure upon a support I employ suitable fastening devices such as the spring fasteners 24 here illustrated. This fastener is of a well known commercial variety. Any type of fastener or securing device might be used. The fastener shown has a split shank and an expansible head portion 26 which is held normally expanded but is adapted to be compressed to be passed through the opening through the spacer formed by the sleeves. When passed through this opening the fastener serves the purpose of cooperating with the sleeves and spacers to hold the several laminations together and also serves to secure the laminated structure to a suitable support.

The structure is shown as secured to a support in Fig. 2. To accomplish this the support is provided with apertures which register with the fasteners and the panel is juxtaposed against the support with the fasteners in position to be received through the apertures in the support. The panel is then compressed sufficiently to permit the fasteners to enter the apertures within the support.

An advantage of this construction is that the split sleeves will cooperate with the spacers to secure the several laminations of the panel together without the employment of the fasteners and when it is desired to secure the panel to a support provided with apertures to receive the same the worker can see to align the sleeve apertures with the apertures through the support. Upon this alignment being accomplished the fasteners may then be inserted in place.

As the expansible heads of the fasteners are passed through the apertures within the support they expand sufficiently to engage the support to secure the panel thereto. This expansion is due to the inherent expansible tendency of the split spring fastener. The spacer elements are compressed sufficiently to permit of this compression of the laminated panel against the support. The split sleeves permit limited compression of the spacer elements while preventing undue compression which might result from the stacking or storing of a plurality of panels. Such undue compression if permitted might result in permanent densification or compacting of the interior insulation layer as a result of its thermoplastic characteristic.

In Fig. 4 is illustrated a modified form of construction wherein the sleeves of the securing device which fastens the several laminations of the panel together do not extend through the spacers. The spacers are provided as hereinabove described except that such spacers are not of tubular construction. They are positioned within provided openings in the insulation material and space the outer protective laminations a desired distance apart. Split tubular sleeves of a construction somewhat different from that heretofore described are provided. These sleeves are indicated as 28. The sleeves are provided with flanges which engage over the outer protective laminations as hereinabove described. They telescope each other as shown. They are split to facilitate telescoping and provided with cooperating detents 30 which, upon engagement, determine the normal thickness of the structure. The detent engagement is releasable to permit further pressure against the resistance offered by the resilient spacers. Upon release the compression spacers return the parts to their normal thickness as determined by the sleeves.

In Fig. 5 a second modified form is shown wherein spring spacing means 32 cooperates with the sleeves 28 to maintain the normal expanded thickness of the layers while permitting temporary compression and operating to return the parts for the normal thickness upon release of the compression.

What I claim is:

1. A laminated panel comprising an interior lamination of loosely integrated cellular compressible insulation material arranged between two outer protective laminations, a tubular spacer element disposed within the interior lamination between the outer laminations and a securing element attached to each of the outer laminations and extending one into each end of the tubular spacer element holding the several laminations together.

2. A laminated panel comprising an interior lamination of loosely integrated cellular compressible insulation material arranged between two outer protective laminations, a tubular spacer element disposed within said interior lamination between said outer laminations, and a pair of tubular securing elements attached one to each outer lamination and extending into the tubular spacer element holding the several laminations together, said tubular securing elements being of such a length that their opposed ends within the spacer element are spaced apart to permit limited axial compressibility of the spacer element and a fastener element extending through the pair of tubular securing elements and spacer.

3. A laminated panel comprising an interior lamination of loosely integrated cellular compressible insulation material arranged between two outer protective laminations, a plurality of compressible spacer elements disposed within said interior lamination between said outer laminations, and tubular securing elements attached to each outer lamination and extending into the spacer elements holding the several laminations together, said tubular securing elements provided with means adapted to engage securely within said spacer elements.

4. A laminated structure comprising an internal lamination arranged between two external laminations, a tubular spacer disposed within the thickness of the internal lamination between the two external laminations, a pair of tubular parts secured to the external laminations and extending into opposite ends of the tubular spacer one tubular part being secured to one external lamination and projecting into the adjacent end of the tubular spacer and the other tubular part being secured to the other external lamination and projecting into the opposite end of the tubular spacer.

5. A laminated structure comprising an internal lamination arranged between two external laminations, a tubular spacer disposed within the thickness of the internal lamination between the two external laminations, a pair of tubular parts secured to the external laminations and extending into opposite ends of the tubular spacer and provided with portions engaging the external laminations and engaging the spacer to secure the parts thereto.

6. A laminated structure comprising a compressible internal lamination arranged between two outer laminations, a spacer disposed within the thickness of the internal lamination between the two outer laminations, said spacer being resistingly compressible to a less extent than the internal lamination, means securing the several laminations together through the spacer, said means having cooperating abutting portions adapted to be brought into engagement upon limited compression of the spacer preventing further compression thereof.

7. A laminated structure comprising a compressible internal lamination arranged between two outer laminations, a spacer disposed within the thickness of the internal lamination between the two outer laminations, said spacer being resistingly compressible to a less extent than the internal lamination, a pair of split sleeves associated with each spacer element securing the outer laminations thereto, a spring fastener receivable through said split sleeves, said spacer element being axially compressible to a limited extent on said fastener.

8. A laminated panel comprising a compressible fragile interior lamination of insulation material arranged between two outer protective laminations, compressible resilient spacer elements arranged within the thickness of the interior lamination between the two outer laminations, a pair of aligned tubular securing elements one secured to each outer lamination and extending into the interior lamination, and securing means extending through said tubular elements connecting the outer laminations together through the interior lamination.

9. A laminated panel comprising a compressible fragile interior lamination of insulation material arranged between two outer protective laminations, a spacer element arranged within the thickness of the interior lamination between the two outer protective laminations, a pair of aligned tubular securing elements one secured to each outer lamination and extending into the interior lamination, said spacer element and tubular elements adapted to maintain the spaced apart relationship at the outer lamination against undue compression or expansion.

10. A laminated panel comprising a compressible fragile interior lamination of insulation material arranged between two outer protective laminations, a spacer element arranged within the thickness of the interior lamination between the two outer protective laminations, a pair of aligned tubular securing elements one secured to each outer lamination and extending into the interior lamination, said tubular elements being telescoped together and provided with interlocking portions permitting telescoping movement while securing said elements together.

11. A laminated panel comprising a compressible fragile interior lamination of insulation material arranged between two outer protective laminations, a pair of telescoping tubular elements one secured to each outer lamination and extending into the interior lamination and provided with releasably engageable cooperating portions adapted to determine the normal thickness of the laminated structure and resilient means cooperating with said tubular elements adapted to yieldingly maintain said panel at a minimum thickness while yieldingly permitting compression below said thickness.

12. A laminated panel comprising a loosely integrated cellular compressible interior lamination of insulation material arranged between two outer protective laminations, connecting means extending through said laminations securing them together, and a spring member associated with said connecting means adapted to normally yieldingly maintain said outer laminations at a determined spaced apart distance.

13. A laminated panel comprising a loosely integrated cellular compressible interior lamination of insulation material arranged between two outer protective laminations, tubular telescoping connecting means extending through said panel securing the several laminations thereof together, and a resilient spacer element arranged within the thickness of the interior lamination between the two outer laminations holding them yieldingly normally in spaced apart relationship.

GEORGE R. CUNNINGTON.